United States Patent
Liebinger et al.

(10) Patent No.: US 10,563,995 B2
(45) Date of Patent: *Feb. 18, 2020

(54) VEHICLE ROUTING AND NOTIFICATIONS BASED ON CHARACTERISTICS

(71) Applicant: International Business Machines Corporation, Armonk, NY (US)

(72) Inventors: Franz F. Liebinger, San Pablo de Heredia (CR); Roxana Monge Nunez, San Jose (CR); Juan G. Rodriguez, San Jose (CR); Edgar A. Zamora Duran, Santo Domingo (CR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/844,893

(22) Filed: Dec. 18, 2017

(65) Prior Publication Data

US 2018/0238702 A1 Aug. 23, 2018

Related U.S. Application Data

(63) Continuation of application No. 15/440,881, filed on Feb. 23, 2017.

(51) Int. Cl.
*G06Q 40/08* (2012.01)
*G01C 21/34* (2006.01)
(Continued)

(52) U.S. Cl.
CPC ..... *G01C 21/3484* (2013.01); *G01C 21/3461* (2013.01); *G01C 21/3626* (2013.01);
(Continued)

(58) Field of Classification Search
CPC ............... G06Q 40/08; G06Q 10/0435; G01C 21/3697; G01C 21/3461; G08G 1/205;
(Continued)

(56) References Cited

U.S. PATENT DOCUMENTS 8,160,811 B2 4/2012 Prokhorov
8,332,242 B1 12/2012 Medina, III
(Continued)

FOREIGN PATENT DOCUMENTS

KR 20090057528 6/2009

OTHER PUBLICATIONS

Early alert system using relative positioning in Vehicular Ad-hoc Network; Y. C. Raut; V. N. Katkar; S. M. Sarode 2014 Annual Inter Conf. on Emerging Research Areas: Magnetics, Machines and Drives (AICERA/iCMMD). (Year: 2014).*

(Continued)

*Primary Examiner* — Cuong H Nguyen
(74) *Attorney, Agent, or Firm* — Cuenot, Forsythe & Kim, LLC

(57) ABSTRACT

Data indicating current driving characteristics of a driver driving a vehicle can be received in real time. A driving profile for the driver can be determined based on the data. The driving profile can be categorized into a driving pattern category. A plurality of candidate travel routes for the driver to reach an intended destination can be identified and, for each of the candidate travel routes, a plurality of route segments can be identified. Based on the driving pattern category, a probability that the current driving characteristics of the driver will cause a traffic accident can be determined for each of the plurality of route segments. Route segments for which the probability that the current driving characteristics of the driver will cause the traffic accident exceeds a threshold value can be determined. A notification (Continued)

can be communicated to the driver or vehicle indicating such probability.

8 Claims, 7 Drawing Sheets

(51) Int. Cl.
  *G01C 21/36* (2006.01)
  *G01S 19/42* (2010.01)
  *B60W 40/09* (2012.01)
(52) U.S. Cl.
  CPC ......... *G01C 21/3691* (2013.01); *B60W 40/09* (2013.01); *G01C 21/3492* (2013.01); *G01C 21/3617* (2013.01); *G01S 19/42* (2013.01)
(58) Field of Classification Search
  CPC ....... G08G 1/096838; G08G 1/096855; G08G 1/096822; G06F 19/328
  USPC ................................. 701/409, 410, 414, 415
  See application file for complete search history.

(56) References Cited

U.S. PATENT DOCUMENTS

| | | | |
|---|---|---|---|
| 8,612,139 B2 | 12/2013 | Wang et al. | |
| 8,810,425 B2* | 8/2014 | Hyde ...................... | G08B 3/10 340/686.6 |
| 9,020,751 B1 | 4/2015 | Bogovich et al. | |
| 9,086,292 B2* | 7/2015 | Horvitz .............. | G01C 21/3697 |
| 9,141,975 B2 | 9/2015 | Meller | |
| 9,625,266 B1* | 4/2017 | Chintakindi ....... | G01C 21/3691 |
| 9,666,072 B2* | 5/2017 | Fowe ............... | G08G 1/096775 |
| 9,739,627 B1* | 8/2017 | Chintakindi ....... | G01C 21/3691 |
| 9,805,601 B1* | 10/2017 | Fields .............. | G08G 1/096791 |
| 9,851,214 B1* | 12/2017 | Chintakindi ....... | G01C 21/3691 |
| 9,870,649 B1* | 1/2018 | Fields .............. | G08G 1/096791 |
| 10,049,408 B2* | 8/2018 | Carver ................... | G06Q 40/08 |
| 10,132,644 B2* | 11/2018 | Chintakindi ....... | G01C 21/3691 |
| 10,163,350 B1* | 12/2018 | Fields .............. | G08G 1/096791 |
| 10,217,169 B2* | 2/2019 | Schumann, Jr. ....... | G06Q 40/08 |
| 10,223,751 B1* | 3/2019 | Hutchinson ............ | G06Q 40/08 |
| 10,255,638 B2* | 4/2019 | Cote ....... | G07C 5/008 |
| 10,269,075 B2* | 4/2019 | Hsu-Hoffman ........ | G06Q 40/08 |
| 10,417,592 B2* | 9/2019 | Byk ................. | G06Q 10/06315 |
| 2010/0332131 A1* | 12/2010 | Horvitz .............. | G01C 21/3484 701/414 |
| 2011/0071759 A1 | 3/2011 | Pande | |
| 2011/0106370 A1* | 5/2011 | Duddle ................. | G06Q 40/08 701/31.4 |
| 2013/0073112 A1* | 3/2013 | Phelan .................. | G06Q 40/00 701/1 |
| 2014/0080100 A1* | 3/2014 | Phelan .................. | G06Q 40/00 434/66 |
| 2014/0087335 A1* | 3/2014 | Phelan .................. | G06Q 40/00 434/66 |
| 2014/0244156 A1 | 8/2014 | Magnusson | |
| 2014/0278808 A1* | 9/2014 | Iyoob ................. | G06Q 30/0206 705/7.35 |
| 2014/0303833 A1* | 10/2014 | Phelan .................. | G06Q 40/00 701/31.5 |
| 2014/0358326 A1* | 12/2014 | Phelan .................. | G06Q 40/00 701/1 |
| 2015/0260531 A1 | 9/2015 | Ehsani et al. | |
| 2015/0262435 A1* | 9/2015 | Delong ................ | G07C 5/0816 340/439 |
| 2016/0114807 A1* | 4/2016 | Phelan .................. | G06Q 40/00 701/70 |
| 2016/0123743 A1* | 5/2016 | Sisbot ................ | G01C 21/3461 701/538 |
| 2016/0129914 A1* | 5/2016 | Phelan .................. | G06Q 40/00 701/70 |
| 2016/0171521 A1* | 6/2016 | Ramirez ............ | G06Q 30/0224 701/409 |
| 2016/0371787 A1* | 12/2016 | Rackley, III ....... | G06Q 30/0645 |
| 2017/0221149 A1* | 8/2017 | Hsu-Hoffman ........ | G06Q 40/08 |
| 2017/0287076 A1* | 10/2017 | Bowne ............... | G06Q 10/0639 |
| 2017/0292848 A1* | 10/2017 | Nepomuceno ..... | G01C 21/3492 |
| 2017/0307396 A1 | 10/2017 | So | |
| 2018/0075538 A1* | 3/2018 | Konrardy ............... | G06Q 40/08 |
| 2018/0082383 A1* | 3/2018 | Bogovich ............. | G06Q 40/08 |
| 2018/0114377 A1* | 4/2018 | Dyeyev .................. | G07C 5/008 |
| 2018/0165531 A1* | 6/2018 | Sathyanarayana ... | G05D 1/0088 |
| 2018/0170375 A1* | 6/2018 | Jang .................. | B60W 30/0956 |
| 2018/0201263 A1* | 7/2018 | Slusar ................ | B60W 30/143 |
| 2018/0238701 A1 | 8/2018 | Liebinger et al. | |
| 2019/0094035 A1 | 3/2019 | Liebinger et al. | |

OTHER PUBLICATIONS

EV-planning: Electric vehicle itinerary planning; Sara Mehar et al.; 2013 International Conference on Smart Communications in Network Technologies; (SaCoNeT); Year: 2013, vol. 01; pp. 1-5. (Year: 2013).*

Computational framework for subjective preference based route selection in pedestrian navigation system; Basabi Chakraborty; Takako Hashimoto;TENCON 2011—2011 IEEE Region 10 Conf; pp. 1144-1148. (Year: 2011).*

HERO: Hybrid Emergency Route-Opening Protocol; Jonathan Woodbridge et al.; 2010 8th IEEE International Confer. on Pervasive Computing and Comm.Workshops (PERCOM Workshops); pp. 364-369. (Year: 2010).*

Intelligent speed profile prediction on urban traffic networks with machine learning; Jungme Park et al. The 2013 International Joint Conference on Neural Networks (IJCNN); pp. 1-7; (year 2013).*

Stochastic modeling of load demand of plug-in hybrid electric vehicles using fuzzy logic; Jun Tan; Lingfeng Wang 2014 IEEE PES T&D Conference and Exposition; pp. 1-5; year 2014.*

A prediction system based on vehicle sensor data in automated highway; S. Attouche ; S. Hayat ; M. Staroswiecki; ITSC2000. 2000 IEEE Intelligent Transportation Systems. Proceedings (Cat. No. 00TH8493) ;Year: 2000; pp. 494-499; IEEE Conferences. (Year: 2000).*

Driving pattern fusion using dempster-shafer theory for fuzzy driving risk level assessment; Gültekin Gündüz ; çağdaş Yaman ; Ali Ufuk Peker ; Tankut Acarman; 2017 IEEE Intelligent Vehicles Symposium (IV); Year: 2017; pp. 595-599; IEEE Conferences. Year: (2017).*

Prediction of Risk Generated by Different Driving Patterns and Their Conflict Redistribution; Gültekin Gündüz ; çağdaş Yaman ; Ali Ufuk Peker ; Tankut Acarman; IEEE Transactions on Intelligent Vehicles; Year: 2018 , vol. 3 , Issue: 1; pp. 71-80; IEEE Journals & Magazines. (Year: 2018).*

Comparative analysis on information fusion conflict redistribution and driving risk classification; Gültekin Gündüz ; çağdaş Yaman ; Ali Ufuk Peker ; Tankut Acarman; 2017 IEEE 20th International Conference on Intelligent Transportation Systems (ITSC) Year: 2017; pp. 1-6; IEEE Conferences. (Year: 2017).*

Ueyama, M. et al., "Relationship between Driving Behavior and Traffic Accidents—Accident Data Recorder and Driving Monitor Recorder," National Highway Traffic Safety Administration., In Proc. of Int'l. Technical Conf. on the Enhanced Safety of Vehicles 1998, vol. 1998, pp. 402-409.

Guarino, J. et al., "Factors Involved in Fatal Vehicle Crashes," US Department of Transportation, Bureau of Transportation Statistics, RITA Technical Report, No. TR-008, Sep. 2010, 6 pg.

"CAN bus," [online] Wikipedia, the free encyclopedia, Feb. 21, 2017 [retrieved Feb. 23, 2017] retrieved from the Internet: <https://en.wikipedia.org/w/index.php?title=CAN_bus&oldid=766622681>, 15 pg.

"Vehicle On-board Diagnostic," [online] ObdDiag.Net [retrieved Feb. 23, 2017] retrieved from the Internet: <http://www.obddiag.net/adapter.html>, 3 pg.

"ECU Designing and Testing using National Instruments Products," [online] National Instruments © 2017, Nov. 7, 2009 [retrieved Feb. 23, 2017], retrieved from the Internet: <http://www.ni.com/white-paper/3312/en/>, 8 pg.

(56) References Cited

OTHER PUBLICATIONS

"Electronic Control Unit," [online] Wikipedia, the free encyclopedia, Dec. 31, 2016 [retrieved Feb. 23, 2017], retrieved from the Internet: <https://en.wikipedia.org/w/index.php?title=Electronic_control_unit&oldid=757626125>, 3 pg.

Hallac, D. et al., "Driver Identification Using Automobile Sensor Data from a Single Turn," In 2016 IEEE 19th Int'l Conf. on Intelligent Transportation Sytems (ITSC), Nov. 1, 2016, pp. 953-958.

Xu, Z. et al., "A basic study for improving the predictability of amber traffic lights: Comparing the brief and long interval rhythm prediction," In 2016 IEEE International Conference on Mechatronics and Automation (ICMA), Aug. 7, 2016 pp. 2587-2592.

\* cited by examiner

| | | |
|---|---|---|
| Driver | John Smith | — 210 |
| Vehicle | VIN # 123456 | — 212 |
| Acceleration | High | — 214 |
| Shifting | Between 3000 and 4500 RPM | — 216 |
| Hand Position on Steering Wheel | 12 and 3 o'clock | — 218 |
| Breaking | Sudden | — 220 |
| Torque | 80-100 N-m | — 222 |
| Weather | Rain | — 224 |
| Temperature | 22 | — 226 |
| Road Type | Asphalt | — 228 |
| Date | 12/23/16 Tuesday | — 230 |
| Time | 7:15 AM | — 232 |

| 300 | Novice ↓ 310 | Passive ↓ 312 | Active ↓ 314 | Risky ↓ 316 | Dangerous ↓ 318 |
|---|---|---|---|---|---|
| Acceleration | Slow | Medium | High | Very High | Slow and Very High — 330 |
| Shifting | Between 1000 and 4000 RPM | Between 2000 and 3000 RPM | Between 3000 and 4500 RPM | Between 3500 and 6000 RPM | No Pattern — 332 |
| Hand Position on Steering Wheel | 3 and 9 o'clock | 3 and 9 o'clock 12 and 3 o'clock | 12 and 3 o'clock | 12 and 3 o'clock One hand at 12 o'clock | One hand at 6 o'clock — 334 |
| Breaking | Imprecise | Normal | Sudden | Abrupt | No breaking Abrupt — 336 |
| Torque | 40-60 N-m | 60-80 N-m | 80-100 N-m | >100 N-m | >120 N-m — 338 |
| Weather | Rain | | | | — 320 |
| Temperature | 20-30 | | | | — 322 |
| Road Type | Asphalt | | | | — 324 |
| Route Segment | I95; between Lat 26.8621466, Lon -80.116404 and Lat. 26.843978 and Lon -80.105617 | | | | — 326 |

```
┌─────────────────────────────────────────────────────────────────────┐
│ Receive, in real time, data indicating current driving              │
│ characteristics of a driver driving a vehicle, the data indicating  │
│ the current driving characteristics being generated, at least in    │
│ part, by a plurality of sensors in the vehicle                      │
│                                602                                  │
└─────────────────────────────────────────────────────────────────────┘
                                   ↓
┌─────────────────────────────────────────────────────────────────────┐
│ Based on the data indicating the current driving characteristics    │
│ of the driver, determine a driving profile for the driver           │
│                                604                                  │
└─────────────────────────────────────────────────────────────────────┘
                                   ↓
┌─────────────────────────────────────────────────────────────────────┐
│ Categorize the driving profile for the driver into a driving        │
│ pattern category                                                    │
│                                606                                  │
└─────────────────────────────────────────────────────────────────────┘
                                   ↓
┌─────────────────────────────────────────────────────────────────────┐
│ Determine an intended destination of the driver driving the vehicle │
│                                608                                  │
└─────────────────────────────────────────────────────────────────────┘
                                   ↓
┌─────────────────────────────────────────────────────────────────────┐
│ Identify a plurality of candidate travel routes for the driver to   │
│ reach the intended destination and, for each of the candidate       │
│ travel routes, identify a plurality of route segments               │
│                                610                                  │
└─────────────────────────────────────────────────────────────────────┘
                                   ↓
┌─────────────────────────────────────────────────────────────────────┐
│ Based on the driving pattern category into which the driving        │
│ profile is categorized, determine, for each of the plurality of     │
│ route segments, a probability that the current driving              │
│ characteristics of the driver will cause a traffic accident         │
│                                612                                  │
└─────────────────────────────────────────────────────────────────────┘
                                   ↓
┌─────────────────────────────────────────────────────────────────────┐
│ Determine the route segments for which the probability that the     │
│ current driving characteristics of the driver will cause the        │
│ traffic accident exceeds a threshold value                          │
│                                614                                  │
└─────────────────────────────────────────────────────────────────────┘
                                   ↓
┌─────────────────────────────────────────────────────────────────────┐
│ Communicate to the driver or the vehicle a notification indicating  │
│ that the probability that the current driving characteristics of    │
│ the driver will cause the traffic accident exceeds the threshold    │
│ value on the determined route segments                              │
│                                616                                  │
└─────────────────────────────────────────────────────────────────────┘
```

FIG. 6

VEHICLE ROUTING AND NOTIFICATIONS BASED ON CHARACTERISTICS

BACKGROUND

The present invention relates to data processing systems, and more specifically, to navigation systems.

Many automobile drivers find navigation systems more convenient to use than traditional maps, and navigation systems have largely displaced the use of traditional maps. Navigation systems represent a convergence of a number of diverse technologies, including database technologies and global positioning systems (GPSs). Navigation systems typically use a road database in which street names or numbers and street addresses are encoded as geographic coordinates. The navigation systems can receive GPS coordinates for a particular automobile and, using the road database, determine directions a driver should navigate from a current location to arrive at a desired destination. The directions may be presented to the user, for example via a dedicated navigation unit, a smart phone or a tablet computer, to guide the user to the desired destination. In some cases, the directions may be provided to an autonomous vehicle, and the autonomous vehicle can follow the directions to arrive at a desired destination.

SUMMARY

A system includes a processor programmed to initiate executable operations. The executable operations include receiving, in real time, data indicating current driving characteristics of a driver driving a vehicle, the data indicating the current driving characteristics being generated, at least in part, by a plurality of sensors in the vehicle. The executable operations also can include, based on the data indicating the current driving characteristics of the driver, determining a driving profile for the driver. The executable operations also can include categorizing the driving profile for the driver into a driving pattern category. The executable operations also can include determining an intended destination of the driver driving the vehicle. The executable operations also can include identifying a plurality of candidate travel routes for the driver to reach the intended destination and, for each of the candidate travel routes, identifying a plurality of route segments. The method also can include, based on the driving pattern category into which the driving profile is categorized, determining for each of the plurality of route segments, a probability that the current driving characteristics of the driver will cause a traffic accident. The executable operations also can include determining the route segments for which the probability that the current driving characteristics of the driver will cause the traffic accident exceeds a threshold value. The executable operations also can include communicating to the driver or the vehicle a notification indicating that the probability that the current driving characteristics of the driver will cause the traffic accident exceeds the threshold value on the determined route segments.

A computer program includes a computer readable storage medium having program code stored thereon. The program code is executable by a processor to perform a method. The method includes receiving, by the processor in real time, data indicating current driving characteristics of a driver driving a vehicle, the data indicating the current driving characteristics being generated, at least in part, by a plurality of sensors in the vehicle. The method also can include, based on the data indicating the current driving characteristics of the driver, determining, by the processor, a driving profile for the driver. The method also can include categorizing, by the processor, the driving profile for the driver into a driving pattern category. The method also can include determining, by the processor, an intended destination of the driver driving the vehicle. The method also can include identifying, by the processor, a plurality of candidate travel routes for the driver to reach the intended destination and, for each of the candidate travel routes, identifying, by the processor, a plurality of route segments. The method also can include, based on the driving pattern category into which the driving profile is categorized, determining, by the processor, for each of the plurality of route segments, a probability that the current driving characteristics of the driver will cause a traffic accident. The method also can include determining, by the processor, the route segments for which the probability that the current driving characteristics of the driver will cause the traffic accident exceeds a threshold value. The method also can include communicating, by the processor, to the driver or the vehicle a notification indicating that the probability that the current driving characteristics of the driver will cause the traffic accident exceeds the threshold value on the determined route segments.

BRIEF DESCRIPTION OF THE DRAWINGS

FIG. 2 is a table illustrating an example of a driving profile.

FIG. 3 is a table illustrating examples of driving pattern categories.

FIG. 6 is a flow chart illustrating another example of a method of alerting a driver that the driver's current driving characteristics exceed a threshold value for a risk of causing a traffic accident.

DETAILED DESCRIPTION

Figure 1:
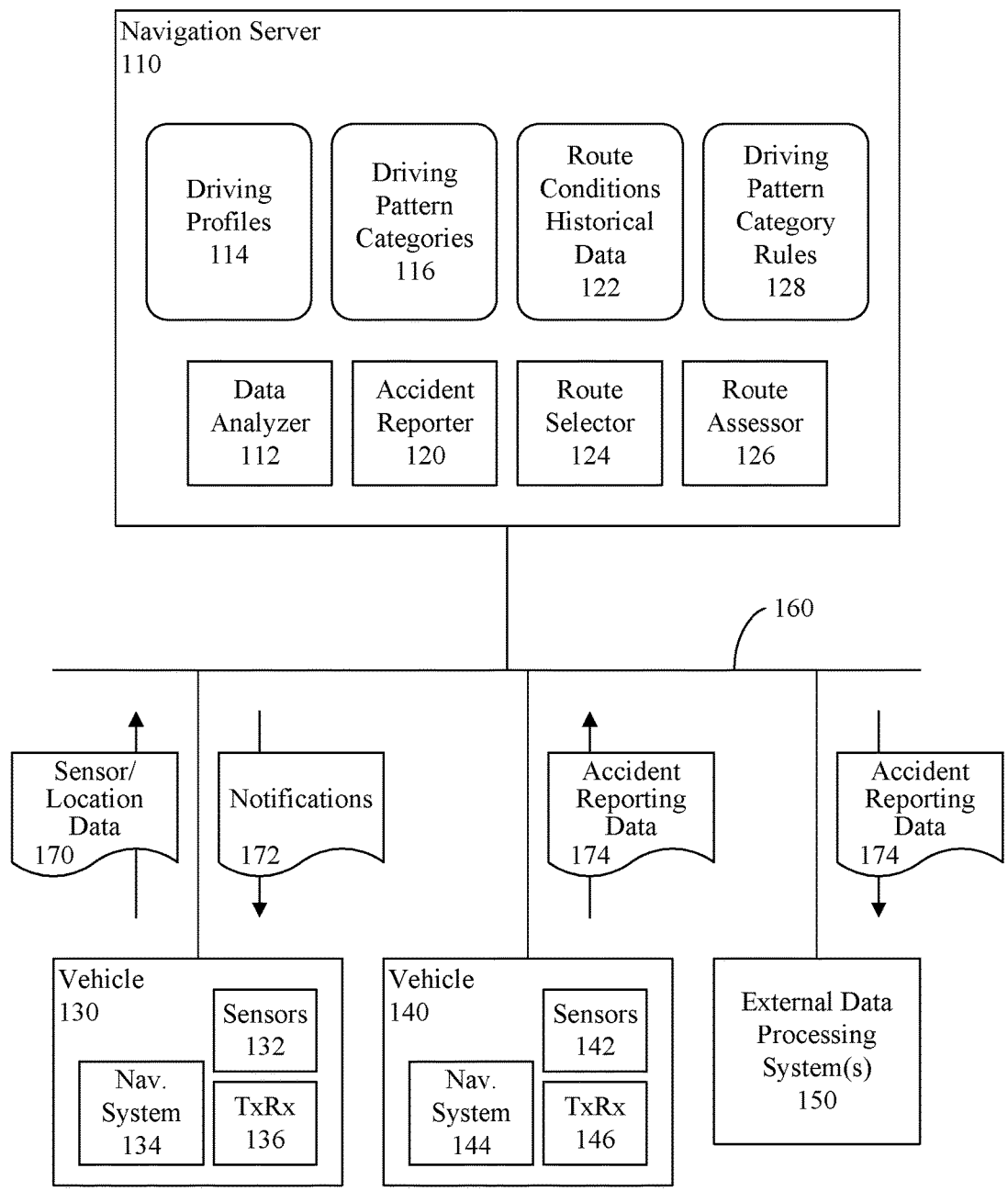
FIG. 1 is a block diagram illustrating an example of a computing environment.

This disclosure relates to data processing systems, and more specifically, to navigation systems. In accordance with the inventive arrangements disclosed herein, data indicating current driving characteristics of a driver driving a vehicle can be received in real time. The data can be generated by various sensors in the vehicle. Based on the data, a driving profile for the driver can be determined. Further, the driving profile can be categorized into a driving pattern category. Based on the driving pattern category, a probability the driver will cause a traffic accident can be determined for each of a plurality of route segments the vehicle may travel to reach an intended destination. If the probability exceeds a threshold value, a notification can be communicated to the vehicle or the driver. The notification can influence the driver to change his/her driving characteristics, and thus reduce the risk of causing an accident.

Several definitions that apply throughout this document now will be presented.

As defined herein, the term "driving characteristic" means a trait of a manner in which a driver drives a vehicle.

As defined herein, the term "current driving characteristic" means a driving characteristic identified during a current vehicle driving session.

As defined herein, the term "driving profile" means functional data structure comprising driving characteristic for a particular driver.

As defined herein, the term "driving pattern category" means a category to which one or more driving profiles are assigned based on, at least in part, driving characteristics indicated in the driving profiles.

As defined herein, the term "travel route" means a path along one or more roadways on which a vehicle travels.

As defined herein, the term "candidate travel route" means a travel route on which a vehicle may travel to reach a destination.

As defined herein, the term "route segment" means a segment of a travel route.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

FIG. 1 is a block diagram illustrating an example of a computing environment 100. The computing environment 100 can include a navigation server 110 and a plurality of vehicles 130, 140. Optionally, the computing environment 100 can include one or more external processing systems 150. The navigation server 110 can communicatively link to the vehicles 130, 140 and the external processing systems 150 via at least one communication network 160. The communication network 160 is the medium used to provide communications links between various devices and data processing systems connected together within the computing environment 100. The communication network 160 may include connections, such as wire, wireless communication links, or fiber optic cables. The communication network 160 can be implemented as, or include, any of a variety of different communication technologies such as a WAN, a LAN, a wireless network, a mobile network, a Virtual Private Network (VPN), the Internet, the Public Switched Telephone Network (PSTN), or similar technologies.

Each vehicle 130, 140 can include a plurality of sensors 132, 142 that detect various parameters and generate corresponding data indicating current driving characteristics of a driver driving the vehicle. Examples of the sensors 132, 142 can include, but are not limited to, sensors that detect steering inputs, speed, engine rpm, motor speed, gear changes, accelerator pedal positions, throttle valve positions, brake pedal positions, anti-lock braking system activation, wheel rotations, differences in rotation among various wheels, traction control activation, wheel slip, torque, linear acceleration, lateral acceleration, linear deceleration, lateral deceleration, collision events, driver gestures, and so on.

Each vehicle 130, 140 also can include a navigation system 134, 144 system that detects current locations of the respective vehicles 130, 140, and generate corresponding location data, for example using a global positioning system (GPS) receiver or other suitable positioning device or system. The navigation system 134, 144 also can present information to drivers of the respective vehicles 130, 140, including navigation directions, notifications, and so on. Each navigation system 134, 144 can be communicatively linked to, or include, a respective wireless transceiver 136, 146 configured to communicatively link the navigation system 134, 144 to the navigation server 110 via the communication network 160.

Each vehicle 130, 140 further can include a system configured collect the sensor data from the respective sensors 132, 142 and communicate the sensor data, in real time, to the respective navigation system 134, 144. For example, each vehicle 130, 140 can include a controller area network (CAN), on-board diagnostics (OBD) system (e.g., OBD-ii system) and/or engine control unit (ECU), each of which are well known to those of ordinary skill in the art.

In operation, the navigation system 134 can communicate in real time, via the transceiver 136, at least a portion of the sensor data generated by the sensors 132, and location data, to the navigation server 110 as sensor/location data 170. Similarly, the navigation system 144 can communicate in real time, via the transceiver 146, at least a portion of the sensor data generated by the sensors 142, and location data, to the navigation server 110 as sensor/location data (not shown). As noted, the sensor data received from each vehicle 130, 140 can indicate the current driving characteristics of the respective driver of that vehicle 130, 140.

The navigation server 110 can include a data analyzer 112. The data analyzer 112 can be configured to, for each driver/vehicle 130, 140, process, in real time, the sensor data received from that vehicle 130, 140 to determine a driving profile 114 for the driver of that vehicle 130, 140. The data analyzer 112 can store the driving profiles 114 to one or more functional data structures, such as one or more data tables.

FIG. 2 is a table 200 illustrating an example of a driving profile 205. The driving profile 205 can be a driving profile 114 for the vehicle 130 and/or a driver of the vehicle 130. The driving profile 205 can include a field 210 indicating a driver of the vehicle 130 and/or a field 212 indicating the vehicle 130. The field 212 can include data indicating a vehicle identification number (VIN) for the vehicle 130 and/or a make and model of the vehicle. The driving profile 205 also can include data 214 indicating a manner in which the driver/vehicle accelerates, data 216 indicating a manner in which the driver shifts the vehicle (e.g., at which revolutions per minute (RPM) the engine reaches before the driver shifts to a next gear), data 218 indicating the driver's hand position on the steering wheel, data 220 indicating a manner in which the driver/vehicle breaks, data 222 indicating a torque generated by the vehicle 130 during acceleration, data 224 indicating current weather conditions, data 226 indicating a current temperature, and data 228 indicating a road type. The road type can be determined by determining a road or road segment on which the vehicle 130 is being driven based on GPS coordinates received from the vehicle 130.

To determine the current weather conditions, temperature and road type, the data analyzer 112 can access data about weather conditions and temperature at various route segments (e.g., roadway segments) and road types for various route segments from suitable data sources (e.g., databases), and correlate the GPS coordinates to the route segments. In another arrangement, the data analyzer 112 can determine the weather, temperature and road type based on sensor data received from the vehicle 130.

The driving profile 205 further can include a field for data 230 indicating current a date and/or day of week and a field for data 232 indicating a time 232 of day. The driving profile 205 also can include an of a myriad of data indicating driving characteristics, for example data indicating lateral acceleration data, data indicating acceleration, data indicating changes in acceleration, data indicating deceleration, data indicating changes in deceleration, data indicating positions of a throttle peal, data indicating positions of a clutch petal, data indicating positions of a brake pedal, and so on.

In one arrangement, the driving profile 205 can be a current driving profile indicating driving characteristics 214-222 for the manner in which the driver is currently driving. In another arrangement, the driving profile 205 can include historical data for the typical driving characteristics 214-222 of the vehicle and/or driver, but updated with the driving characteristics for the manner in which the driver is currently driving. In this regard, for the various driving characteristics 214-222, the data analyzer 112 can assign a weighting factor to current driving characteristics and a weighting factor to historical driving characteristics, and determine the driving characteristics 214-222 for the driving profile 205 based on the assigned weighting factors. The current driving characteristics can be assigned a greater weighting factor than historical driving characteristics.

In one aspect, the historical data indicating typical driving characteristics 214-222 of the vehicle and/or driver can be historical data generated for the vehicle/driver at approximately the same time of day and/or day of the week as the current time. For example, a driver may exhibit different driving characteristics while driving to work than while driving home from work. In this regard, the data analyzer 112 can maintain historical driving characteristics for the driver/vehicle, and categorize the historical driving characteristics based on time of day and/or day of week. When creating a current driving profile 205 for the vehicle, the data analyzer 112 can include in the driving profile 205 historical driving characteristics generated for the driver/vehicle, on one or more previous days, within a time window that includes a time of day that is a same time of day as a current time. The time window can begin a first threshold amount of time before the time of day of the current time and end a second threshold amount of time after the time of day of the current time. The first and second threshold amounts of time can be, for example, 5 minutes, 10 minutes, 15 minutes, 20 minutes, 30 minutes, 45 minutes, 1 hour, 2 hours, etc. In one arrangement, a previous day can be a same day of a week as a current day. In illustration, if the present time is 7:15 AM and the present day of the week is a Tuesday, the data analyzer can include in the driving profile historical data representing driving characteristics of the driver while driving on one or more previous Tuesdays between 6:45 AM and 7:45 AM, and update the historical data with the driving characteristics for the manner in which the driver is currently driving. Accordingly, the driving profile 205 can represent not only the current driving characteristics of the driver/vehicle, but also driving characteristics typically exhibited by the driver/vehicle during that time and on that day of the week.

Referring again to FIG. 1, the data analyzer 112 can categorize, in real time, each driving profile 114 into a driving pattern category 116. FIG. 3 is a table 300 illustrating examples of driving pattern categories 310, 312, 314, 316, 318. The driving pattern categories 310-318 can be defined for a particular type of weather 320, a particular temperature 322 and/or a particular road type 324. In this regard, driving pattern categories 116 can be defined for any of a variety of types of weather conditions, temperature conditions and/or road types. In one arrangement, driving pattern categories 116 can be defined for various route segments, and assigned to the route segments. In illustration, the driving pattern categories 310-318 can be defined for a particular route segment 326, and other driving pattern categories 116 (not shown) can be defined for other route segments.

In the example of FIG. 3, the driving pattern categories 116 can include a novice driving pattern category 310, a passive driving pattern category 312, an active driving pattern category 314, a risky driving pattern category 316 and a dangerous driving pattern category 318 for a rain weather condition, a temperature range between twenty and thirty degrees Celsius, and an asphalt road type on a particular route segment located along interstate I95 between particular GPS coordinates. For each driving pattern category 310-318 for the particular weather condition, temperature range and road type, the table 300 can include data 330, 332, 334, 336, 338 indicating driving characteristics associated with that driving pattern category 310-318, for example as depicted in FIG. 3. The examples presented in FIG. 3, however, are not limiting. The table 300 need not include each of the example driving characteristic data 330-338, and may include other driving characteristic data (not shown).

The driving pattern categories 116 for each route segment can be determined based, at least in part, on historical data indicating accidents on the route segment and driving characteristics of vehicles/drivers involved in such accidents. Such data can be contained in the route conditions historical data 122. For example, the driving pattern category 316 can be determined to be a "risky" driving pattern category if drivers driving with characteristics indicated in the data 330-338 of that driving pattern category 316 have caused a number of accidents between a lower threshold value and an upper threshold value over a certain period of time (e.g., over the last year). Similarly, the driving pattern category 318 can be determined to be a "dangerous" driving pattern category if drivers driving with characteristics indicated in the data 330-338 of that driving pattern category 318 have caused a number of accidents that exceed the upper threshold value over the certain period of time.

Further, for one or more types of driving characteristic data 330-338, threshold values can be defined for each driving pattern category 310-318. For example, a "slow" acceleration can be defined as an acceleration pattern that is between zero and a first threshold value, a "medium" acceleration can be defined as an acceleration pattern that is between the first threshold value and a second threshold value, a "high" acceleration can be defined as an acceleration pattern that is between the second threshold value and a third threshold value, and so on. In some instances, the threshold values can specified within the driving characteristic data 330-338, for example as shown for the driving characteristic data 332, 334 and 338.

In one arrangement, one or more authorized people (e.g., road safety experts) can define each driving pattern category 310-318 for each route segment. In another arrangement, the data analyzer 112 can automatically define each driving pattern category 310-318 based on the route conditions historical data 122 pertaining to the particular route segment and driving pattern category rules (rules) 128 that specify the manner in which driving pattern categories 116 are to be defined and how driving characteristic data 330-338 for the driving pattern categories 116 are to be determined. Nonetheless, one or more authorized people can update the automatically defined driving categories 310-318 as desired. For example, an authorized person can update threshold values indicated for the driving characteristic data 332, 334 and 338, or change one or more of the driving characteristic data 330-338. Further, the data analyzer 112 can, periodically, automatically analyze the driving characteristic data 330-338 for each driving pattern category 310-318 using the route conditions historical data 122 and the rules 128, and update and/or change the driving characteristic data 330-338 based on the route conditions historical data 122. For example, if over time the route conditions historical data 122 indicates that the frequency of accidents on the route segment 326 is increasing, or patterns of driving characteristic data 330-338 of drivers/vehicles involved in accidents are changing, the data analyzer 112 can update the driving pattern categories 310-318 based on such evolving data and the rules 128.

Referring to FIGS. 1-3, to categorize each driving profile 114 into a driving pattern category 116, the data analyzer 112 can match the driving profile 114 to a driving pattern category 116. In illustration, for each driving profile 114, the data analyzer 112 can determine which driving pattern category 116 the driving profile 114 most closely matches based on the driving profile driving characteristics 214-222 and the driving characteristics 330-338. In illustration, if the data analyzer 112 determines that, for current weather, temperature and road type conditions, the driving characteristics 214-222 of the driving profile 205 most closely match certain driving characteristics 330-338 for a particular driving pattern category 314 from among the driving pattern categories 310-318, the data analyzer 112 can categorize that driving profile 205 to that driving pattern category 314.

In one arrangement, the driving profile 205 may not fit an existing driving pattern category 310-318. Responsive to determine that the driving profile 205 does not fit an existing driving pattern category 310-318, the data analyzer 112 can automatically create a new driving pattern category in which the driving profile 205 fits based on the route conditions historical data 122 and the rules 128. Further, the data analyzer 112 can categorize the driving profile 205 into the newly created driving pattern category.

Further, the data analyzer 112 can automatically create a new driving pattern category 116 in response to an unexpected event or condition. For example, if the vehicle 130 experiences a loss of traction on a roadway segment, which can be indicated in the sensor/location data 170, the data analyzer 112 can, in real time, create a new driving pattern category 116 for that roadway segment in response to that condition being detected. In addition to the sensor/location data 170, the data analyzer 112 also can process route conditions historical data 122 for that route segment, using the rules 128, to determine driving characteristic data 330-338 for the new driving pattern category 116. In such case, the rules 128 can include rules that are specific to the detected type of condition that is detected.

In another example, in response to receiving accident reporting data 174 indicating an accident on a route segment, the data analyzer 112 can, in real time, create one or more new driving pattern categories 116 for that roadway segment in response to that event. In addition to the accident reporting data 174, the data analyzer 112 also can process route conditions historical data 122 for that route segment, using the rules 128, to determine driving characteristic data 330-338 for the new driving pattern categories 116. In such case, the rules 128 can be include rules that are specific to the type of detected event. In one arrangement, the new driving pattern categories 116 can replace existing driving pattern categories 116 for the route segment until the accident is cleared. In response to the accident, and any traffic congestion due to the accident, clearing, the data analyzer 112 can replace the new driving pattern categories 116 with the previously existing driving pattern categories 116.

In a further example, the data analyzer 112 can create one or more new driving pattern categories 116 at the behest of an authorized user. In such case, the authorized user may change one or more of the driving characteristic data 330-338 if so desired.

Referring again to FIG. 1, the navigation server 110 can include an accident reporter 120. The accident reporter 120 can receive accident reporting data 174 from the vehicles 130, 140 indicating driving characteristics (e.g., driving patterns) and accidents on various route segments. In a further arrangement, the accident reporter 120 can receive accident reporting data from one or more other external data processing systems 150. For example, the accident reporter 120 can receive from the external data processing systems 150 data indicating accident on various route segments, severity of the accidents, financial losses due to the accidents, traffic delays caused by the accidents, human casualties due to the accidents, and so on. Such data can be based on insurance records for various vehicles, for example records tied to VINs and/or vehicle tag numbers, and/or public records. The accident reporter 120 can store corresponding data as route conditions historical data 122, for example in a database. In this regard, the route conditions historical data 122 can store data indicating accidents on various route segments and driving characteristics of drivers involved in such accidents.

The navigation server 110 can include a route selector 124. The route selector 124 can be configured to identify, for each of the vehicles 130, 140, one or more routes between a current location of the vehicle 130, 140 and a desired destination for the vehicle 130, 140. Further, from among the identified routes for each vehicle 130, 140, the route selector 124 can select a preferred route based on the driving profiles 114 assigned to the drivers of the vehicles 130, 140 and the driving pattern categories 116 to which the driving profiles 114 are assigned.

The navigation server 110 can include a route assessor 126. The route assessor 126 can be configured to provide notifications to drivers of the vehicles 130, 140, for example a notification 172. The notification 172 can indicate whether the current driving characteristics of the driver of the vehicle 130 is safe for the route on which the vehicle currently is traveling. For instance, the notification 172 can indicate a probability that the current driving characteristics of the driver will cause a traffic accident on the current route.

The data analyzer 112, accident reporter 120, route selector 124 and route assessor 126 can be implemented using computer-program code executed by the navigation server 110, and can interface with one another to implement the processes described herein.

Figure 4:
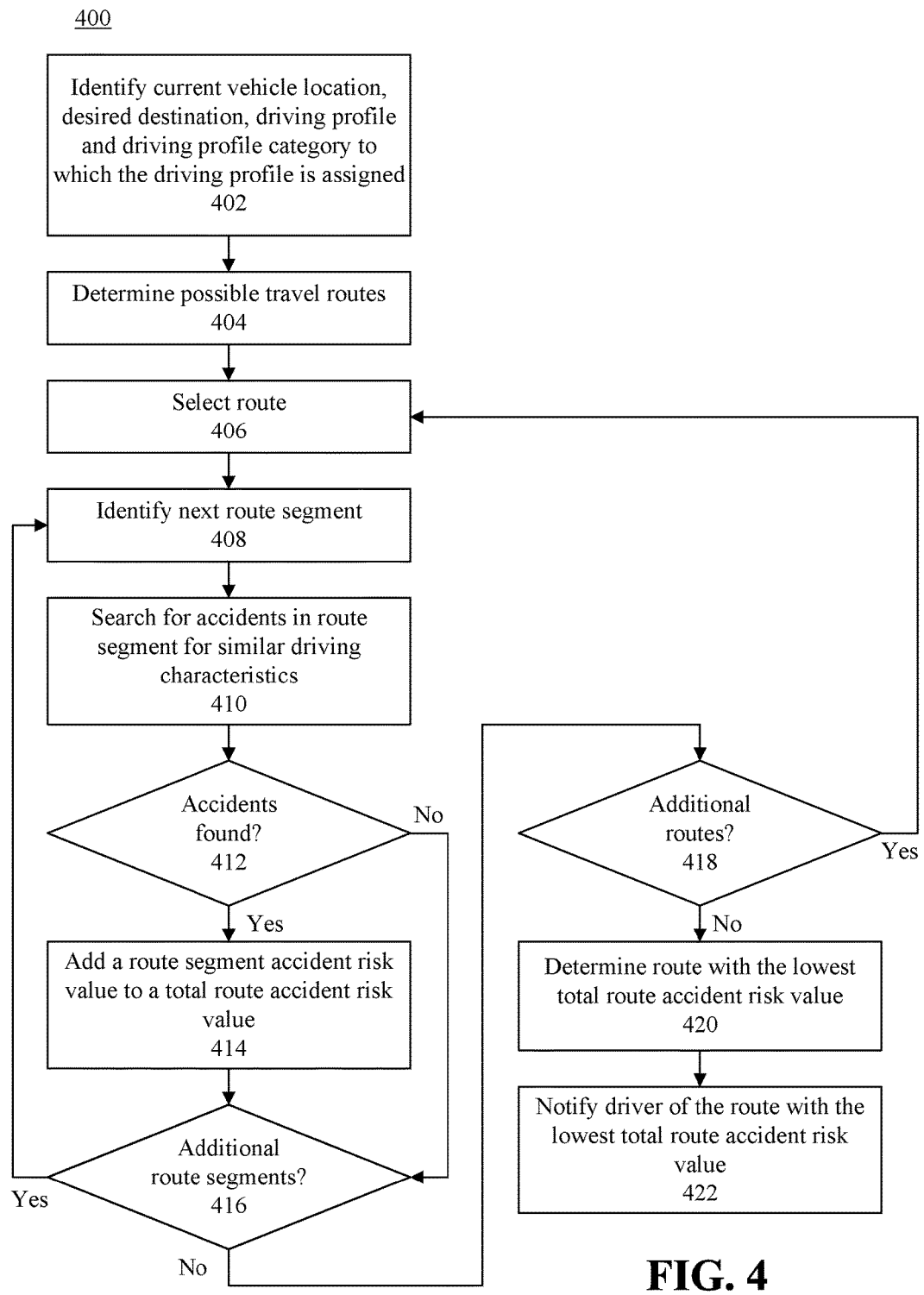
FIG. 4 is a flow chart illustrating an example of a method of selecting a travel route for a vehicle.

FIG. 4 is a flow chart illustrating an example of a method 400 of selecting a travel route for a vehicle 130. The method 400 can be implemented by the navigation server 110.

At step 402, the route selector 124 can identify a current location of the vehicle 130, a desired destination for the vehicle 130, a driving profile 114 for the driver of the vehicle 130, and a driving pattern category 116 to which the driving profile for the driver is assigned.

At step 404, the route selector 124 can determine possible travel routes for the vehicle 130 to travel from the current location to the desired destination. At step 406, the route selector 124 can select a travel route from among the determined possible travel routes. At step 408, the route selector 124 can identify a next route segment. The next route segment can be a next segment of a roadway on which the vehicle 130 will travel if the vehicle travels on the selected travel route.

At step 410, the route assessor 126 can search the route conditions historical data 122 to determine whether the route conditions historical data 122 indicates accidents that have occurred in the next route segment involving drivers having driving characteristics similar to the driving characteristics of the driver of the vehicle 130. For example, the route assessor 126 can determine whether there have been one or more accidents on the route segment involving one or more drivers exhibiting driving patterns similar to the current driving characteristics currently exhibited by the driver of the vehicle 130. Driving patterns of such drivers can be determined to be similar to the current driving characteristics exhibited by the driver of the vehicle 130 if the driving profiles 114 of such drivers are assigned to the same driving pattern category 116 as the driving profile 114 of the driver of the vehicle 130.

At decision box 412, the route assessor 126 can determine whether any such accidents are found in the route conditions historical data 122. If so, at step 414 the route selector 124 can, for the driver of the vehicle 130, add a route segment accident risk value to a total route accident risk value. The route segment accident risk value can be determined based on a probability that a driver having a driving profile 114 assigned to a particular driving pattern category 116 to which the driver's driving profile 114 is assigned will experience an accident on the route segment. Such determination can be based on the route conditions historical data 122. The total route accident risk value can be a summation of route segment accident risk values assigned to the driver of the vehicle 130 on for various route segments of the route selected at step 406.

In one arrangement, the route assessor 126 also can identify one or more events currently affecting travel on the route segment, for example a current accident, current traffic congestion, and so on. The route assessor 126 can assign accident risk values to such events, and add such accident risk values to the total route accident risk value.

Following step 414, or decision box 412 if no accidents are found for the identified route segment, the process can proceed to decision box 416. At decision box 416, the route selector 124 can determine whether there are one or more additional route segments for the route selected at step 406. If so, the process can return to step 408 and a next route segment can be selected and steps/decision boxes 410-416 can be iterated accordingly. If not, the process can proceed to decision box 418.

At decision box 418, the route selector 124 can determine whether there are one or more possible routes determined at step 404 but not yet selected at step 406. If so, the process can return to step 406 and a next possible route can be selected. Steps/decision boxes 408-416 can be iterated accordingly.

If at decision box 418 the route selector 124 determines no additional routes remain that have not been selected, the process can proceed to step 420. At step 420, the route selector 124 can determine a route with the lowest total route accident risk value. At step 422, the route selector 124 can communicate a notification 172 to the vehicle 130, or a driver of the vehicle 130, indicating a recommendation to travel on the route determined to have the lowest total route accident risk value. For example, the route selector 124 can highlight the route in a navigation map presented to the user via a display of a navigation system, smart phone, tablet computer, etc.

Figure 5:
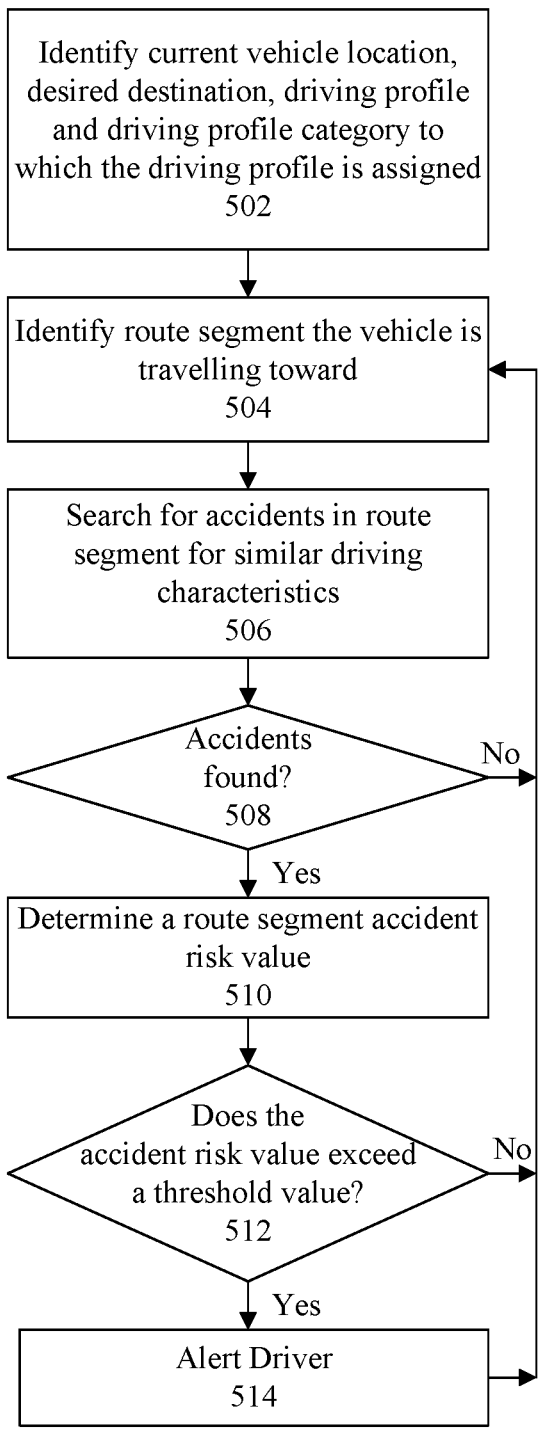
FIG. 5 is a flow chart illustrating an example of a method of alerting a driver that the driver's current driving characteristics exceed a threshold value for a risk of causing a traffic accident.

FIG. 5 is a flow chart illustrating an example of a method 500 of alerting a driver that the driver's current driving characteristics exceed a threshold value for a risk of causing a traffic accident. The method 400 can be implemented by the navigation server 110.

At step 502, the data analyzer 112 can identify a current location of the vehicle 130, a desired destination for the vehicle 130, a driving profile 114 for the driver of the vehicle 130, and a driving pattern category 116 to which the driving profile for the driver is assigned. At step 504, the route assessor 126 can identify a route segment toward which the vehicle 130 is travelling.

At step 506, the route assessor 126 can search the route conditions historical data 122 to determine whether the route conditions historical data 122 indicates accidents that have occurred in the route segment, to which the vehicle 130 is traveling toward, involving drivers having driving characteristics similar to the driving characteristics of the driver of the vehicle 130. For example, the route assessor 126 can determine whether there have been one or more accidents on the route segment involving one or more drivers exhibiting driving patterns similar to the current driving characteristics currently exhibited by the driver of the vehicle 130. Driving patterns of such drivers can be determined to be similar to the current driving characteristics exhibited by the driver of the vehicle 130 if the driving profiles 114 of such drivers are assigned to the same driving pattern category 116 as the driving profile 114 of the driver of the vehicle 130.

At decision box 508, the route assessor 126 can determine whether any such accidents are found in the route conditions historical data 122. If not, the process can return to step 504 and iterate while the vehicle 130 is traveling. If, however, the route assessor 126 identifies any such accidents in the route conditions historical data 122, the process can proceed to step 510.

At step 510, the route assessor 126 can determine, for the driver of the vehicle 130, a route segment accident risk value. The route segment accident risk value can be determined based on a probability that a driver having a driving profile 114 assigned to a particular driving pattern category 116 to which the driver's driving profile 114 is assigned will experience an accident on the route segment. Such determination can be based on the route conditions historical data 122.

In one arrangement, the route assessor 126 also can identify one or more events currently affecting travel on the route segment, for example a current accident, current traffic congestion, and so on. The route assessor 126 can assign accident risk values to such events, and determine the route segment accident risk value, based in part, on the accident risk values assigned to the events currently affecting travel on the route segment.

At decision box 512, the route assessor 126 can determine whether the route segment accident risk value exceeds a threshold value. If not, the process can return to step 504 and iterate while the vehicle 130 is traveling. If the route segment accident risk value does exceed the threshold value, at step 514 the route assessor 126 can alert the driver of such circumstance. For example, the route assessor 126 can communicate to the driver of the vehicle 130 (or the vehicle 130) a notification indicating that the probability that the current driving characteristics of the driver will cause the traffic accident exceeds the threshold value on the route segment toward which the vehicle 130 is travelling.

FIG. 6 is a flow chart illustrating another example of a method 600 of alerting a driver that the driver's current driving characteristics exceed a threshold value for a risk of causing a traffic accident. The method 600 can be implemented by the navigation server 110.

At step 602, the data analyzer 112 can receive, in real time, data indicating current driving characteristics of a driver driving a vehicle, the data indicating the current driving characteristics being generated, at least in part, by a plurality of sensors in the vehicle. At step 604, the data analyzer 112 can, based on the data indicating the current driving characteristics of the driver, determine a driving profile for the driver. At step 606, the data analyzer 112 can categorize the driving profile for the driver into a driving pattern category.

At step 608, the route selector 124 can determine an intended destination of the driver driving the vehicle. At step 610, the route selector 124 can identify a plurality of candidate travel routes for the driver to reach the intended destination and, for each of the candidate travel routes, identify a plurality of route segments.

At step 612, based on the driving pattern category into which the driving profile is categorized, the route assessor 126 can determine, for each of the plurality of route segments, a probability that the current driving characteristics of the driver will cause a traffic accident. In one arrangement, the route assessor 126 also can identify one or more events currently affecting travel on one or more of the route segments, for example a current accident, current traffic congestion, and so on. The route assessor 126 can base determine the probability that the current driving characteristics of the driver will cause a traffic accident based, at least in part, on the event(s) currently affecting travel on the respective route segment.

At step 614, the route assessor 126 can determine the route segments for which the probability that the current driving characteristics of the driver will cause the traffic accident exceeds a threshold value. At step 616, the route assessor 126 can communicate to the driver or the vehicle 130 a notification indicating that the probability that the current driving characteristics of the driver will cause the traffic accident exceeds the threshold value on the determined route segments. In one arrangement, the route selector 124 can determine at least one of the plurality of candidate routes comprising the route segments for which the probability that the current driving characteristics of the driver will cause the traffic accident does not exceed the threshold value. In such an arrangement, the route assessor 126 can communicate to the driver or the vehicle a notification indicating a suggestion to travel the determined at least one of the plurality of candidate routes.

Figure 7:
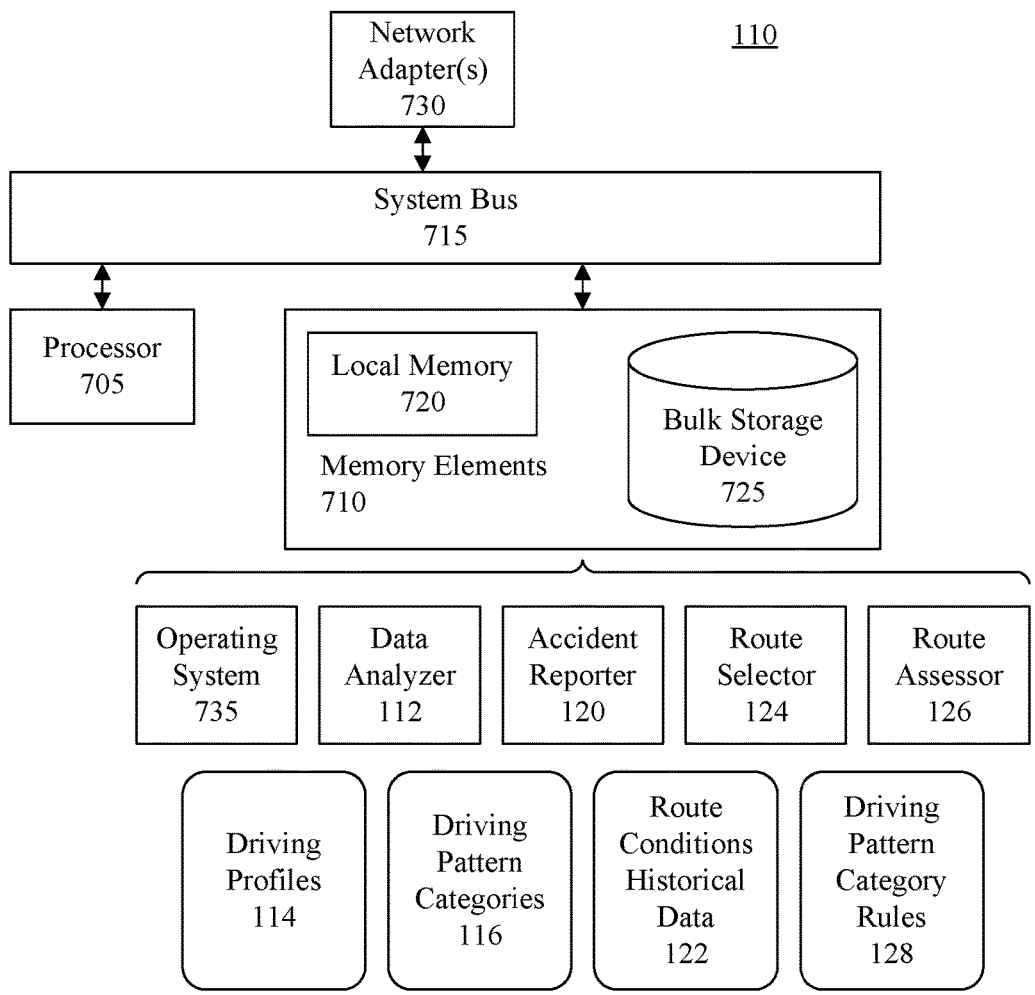
FIG. 7 is a block diagram illustrating example architecture for a navigation server.

FIG. 7 is a block diagram illustrating example architecture for the navigation server 110. The navigation server 110 can include at least one processor 705 (e.g., a central processing unit) coupled to memory elements 710 through a system bus 715 or other suitable circuitry. As such, the navigation server 110 can store program code within the memory elements 710. The processor 705 can execute the program code accessed from the memory elements 710 via the system bus 715. It should be appreciated that the navigation server 110 can be implemented in the form of any system including a processor and memory that is capable of performing the functions and/or operations described within this specification. For example, the navigation server 110 can be implemented as a server or a plurality of communicatively linked servers.

The memory elements 710 can include one or more physical memory devices such as, for example, local memory 720 and one or more bulk storage devices 725. Local memory 720 refers to random access memory (RAM) or other non-persistent memory device(s) generally used during actual execution of the program code. The bulk storage device(s) 725 can be implemented as a hard disk drive (HDD), solid state drive (SSD), or other persistent data storage device. The navigation server 110 also can include one or more cache memories (not shown) that provide temporary storage of at least some program code in order to reduce the number of times program code must be retrieved from the bulk storage device 725 during execution.

One or more network adapters 730 can be coupled to navigation server 110 to enable the navigation server 110 to become coupled to other systems, computer systems, remote printers, and/or remote storage devices through intervening private or public networks. For example, the network adapter(s) 730 can be coupled to one or more mobile networks to which various vehicles are communicatively linked via transceivers. Modems, cable modems, transceivers, and Ethernet cards are examples of different types of network adapters 730 that can be used with the navigation server 110.

As pictured in FIG. 7, the memory elements 710 can store the components of the navigation server 110, namely an operating system 735, the data analyzer 112, the accident reporter 120, the route selector 124, the route assessor 126, the driving profiles 114, the driving pattern categories 116, the route conditions historical data 122 and the driving pattern category rules 128. Being implemented in the form of executable program code, the operating system 735, data analyzer 112, accident reporter 120, route selector 124 and route assessor 126 can be executed by the navigation server 110 and, as such, can be considered part of the navigation server 110. Moreover, the driving profiles 114, driving pattern categories 116, route conditions historical data 122 and driving pattern category rules 128 are functional data structures that impart functionality when employed as part of the navigation server 110.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, in real time, data indicating current driving characteristics of a driver driving a vehicle, the data indicating the current driving characteristics being generated, at least in part, by a plurality of sensors in the vehicle;
based on the data indicating the current driving characteristics of the driver, determining a driving profile for the driver;
categorizing the driving profile for the driver into a driving pattern category;
determining an intended destination of the driver driving the vehicle;
identifying a plurality of candidate travel routes for the driver to reach the intended destination and, for each of the candidate travel routes, identifying a plurality of route segments;
based on the driving pattern category into which the driving profile is categorized, determining, using a processor, for each of the plurality of route segments, a probability that the current driving characteristics of the driver will cause a traffic accident;
determining the route segments for which the probability that the current driving characteristics of the driver will cause the traffic accident exceeds a threshold value; and
communicating to the driver or the vehicle a notification indicating that the probability that the current driving characteristics of the driver will cause the traffic accident exceeds the threshold value on the determined route segments.

2. The method of claim 1, further comprising:
determining at least one of the plurality of candidate routes comprising the route segments for which the probability that the current driving characteristics of the driver will cause the traffic accident does not exceed the threshold value; and
communicating to the driver or the vehicle a notification indicating a suggestion to travel the determined at least one of the plurality of candidate routes.

3. The method of claim 1, further comprising:
determining whether the driving profile for the driver fits an existing driving pattern category; and
responsive to determining that the driving profile for the driver does not fit the existing driving pattern category, automatically creating a new driving pattern category in which the driving profile for the driver fits;
wherein categorizing the driving profile for the driver into the driving pattern category comprises categorizing the driving profile for the driver into the new driving pattern category.

4. The method of claim 1, further comprising:
identifying at least one event currently affecting travel on at least one of the plurality of route segments;
wherein determining the probability that the current driving characteristics of the driver will cause the traffic accident is based, in part, on the event affecting travel on at least one of the plurality of route segments.

5. The method of claim 1, wherein the driving profile for the driver further is based on historical driving characteristics generated for the driver, on at least one previous day, within a time window that includes a time of day that is a same time of day as a current time.

6. The method of claim 5, wherein the at least one previous day is a same day of a week as a current day.

7. The method of claim 1, further comprising:
determining a road type for at least one of the plurality of route segments;
wherein the driving pattern category is defined for that road type.

8. The method of claim 1, further comprising:
- determining a current weather condition or temperature on at least one of the plurality of route segments;
- wherein the driving pattern category is defined for that weather condition or temperature.

\* \* \* \* \*